Patented Dec. 30, 1941

2,267,750

UNITED STATES PATENT OFFICE 2,267,750

PROCESS FOR HYDROLYZING FATS

Norman G. Robisch, Wyoming, Ohio, assignor to The Procter & Gamble Company, Cincinnati, Ohio, a corporation of Ohio No Drawing. Application October 30, 1940, Serial No. 363,507

11 Claims. (Cl. 260—415)

My invention relates to an improvement in processes for hydrolyzing fats.

It consists essentially of an improved method of splitting or hydrolyzing saponifiable fats for production of fatty acids and glycerine by countercurrent flow of preheated fat and preheated water in contact with each other under high temperature and pressure, this improvement comprising simultaneously preheating the fat and presaturating it with water by injecting steam into the fat prior to its hydrolysis.

In application Serial No. 332,268, filed April 29, 1940, R. C. Daniels describes an improvement in processes for hydrolyzing fats, which comprises the steps of predissolving liquid water in the fat to be hydrolyzed and producing a preheated water-in-fat solution by passing fat and water through a heat exchanger. The advantage of the predissolving or presaturating step is that it forestalls the drop in temperature which would otherwise occur in the reaction zone, a temperature drop which is at times as much as 50° F. and which is sufficient to seriously reduce the reaction rate.

My present invention differs from this prior practice and produces certain useful and unexpected results, in that direct steam is substituted both for the presaturating water and for the heat exchanger previously used, and in that the use of steam for these purposes is accomplished in a convenient and easily controlled manner without causing troublesome emulsions or boiling in the hydrolysis reaction chamber. The elimination of the fat heat exchangers previously employed in hydrolyzing processes of this character is decidedly advantageous because such heat exchangers are high in first cost and expensive to operate and maintain.

In carrying out my invention I inject steam into a body of fat to be hydrolyzed in such a manner that while the fat is being heated by this steam approximately to the temperature desired for the hydrolysis reaction it is simultaneously dissolving moisture and becoming substantially saturated with respect to moisture at the temperature of hydrolysis, and preferably in such a manner that any steam not dissolved is condensed in the fat. The term "moisture" is used broadly to include water either in the form of vapor or in liquid form either emulsified or dissolved in another liquid. The fat to be hydrolyzed may be preheated and presaturated either as a batch operation, or during continuous flow of the fat to the hydrolyzer. I will describe my process as it may be applied in several typical cases, although it is to be understood that under various circumstances the process is capable of modification in ways that will be apparent to those skilled in fat hydrolysis operations.

As a typical example: if tallow which is substantially dry and is at a temperature of about 180° F. is to be hydrolyzed at a temperature of about 475° F., I inject a sufficient amount of superheated steam, having a temperature of 700° F., a gauge pressure of 600 pounds per square inch, and about 211° of superheat, into the tallow, while maintaining the latter under a gauge pressure above 525 pounds per square inch (which is the pressure of saturated steam at 475° F.) but below 600 pounds per square inch (the pressure of the preheating steam used), to raise the temperature of the tallow to 475° F. The amount of steam of this quality which, when condensed and cooled to 475° F., is required to heat the fat 295° and to provide the heat of solution for the moisture which the fat dissolves during this heating operation is about 26 pounds per 100 pounds of tallow. Tallow under these conditions is incapable of dissolving more than 11 pounds of water, or somewhat less than this amount. Thus there is an excess of somewhat more than 15 pounds of steam which condenses and remains as free water in the fat.

Any such free water present in the fat at the end of this preheating and presaturating operation may if desired be settled out and withdrawn before the fat enters the hydrolyzing chamber, and this water having about the same temperature as the hydrolyzing temperature may be added to the separately preheated water to be used in the hydrolysis reaction in counter flow to the flow of fat.

As another example: if acidulated cottonseed oil soapstock, that is, acidulated foots from the caustic refining of crude cottonseed oil, is to be hydrolyzed at a temperature of about 475° F., and if to begin with this fat contains about four per cent of dissolved and emulsified moisture and is at a temperature of about 180° F., I may inject superheated steam in amount and under conditions similar to the above example for tallow; or I may instead employ saturated steam having a gauge pressure of 600 pounds per square inch and a temperature of about 489° F., in which case about 31 pounds of steam will be required per 100 pounds of the wet fat. Free water in finely divided form does not readily settle out of unhydrolyzed acidulated soapstock, and I therefore usually allow this water, which under the conditions of this example (using 31 pounds of saturated steam) amounts to somewhat more than 24 pounds per 96 pounds of dry fat, to enter the hydrolysis reaction chamber with the fat. In the hydrolyzer this water joins the descending flow of hydrolyzing water and leaves the hydrolyzer as part of the sweet water. The glycerine which is recoverable from soapstock is usually relatively small in amount and low in value as compared with glycerine recoverable from many other fats, and the sweet water from hydrolysis of soapstock may therefore at times be discarded as worthless.

As another example: if coconut oil which is substantially dry and is at a temperature of about 180° F. is to be hydrolyzed at a temperature of about 475° F., I inject about 23 pounds of 700° F., 600 pounds per square inch gauge pressure, superheated steam into each 100 pounds of oil under the same conditions as in the example for tallow. This amount is sufficient to raise the oil temperature 295° F. and to provide the heat of solution for the moisture which the fat dissolves during this heating operation, which may be the entire 23 pounds. One hundred pounds of coconut oil at 475° F. may be capable of dissolving slightly more than 23 pounds of water. In this event steam of a slightly lower heat content per pound may be employed, if desired, so that the total heat required for the preheating and presaturating operation will just be supplied by the amount of steam required to saturate the oil with respect to its water dissolving capacity. It should be understood, however, that complete presaturation of fat to be hydrolyzed is not necessary, and that worth while benefits result from predissolving in the fat much less water than the amount required to saturate it completely.

When preparing to hydrolyze mixtures of tallow and coconut oil the steam usage may advantageously be intermediate between that employed with each of these fats alone.

I have found that when free water is not to be separated from the preheated fat prior to the entry of the fat into the hydrolyzing chamber it is sometimes convenient and advantageous to perform my preheating and presaturating operation in the lower part of the hydrolyzing chamber itself, instead of performing it in a separate high pressure vessel. This may be accomplished in a countercurrent hydrolyzer, into the lower part of which the fat to be hydrolyzed is introduced in a continuous stream, by providing a perforated pipe or coil in the lower part of the hydrolyzing chamber, placing this preferably slightly below the level at which the fat enters this chamber, and by supplying the desired amount and quality of steam to this pipe or coil at a rate proportionate to the flow of fat, which in this case is relatively dry and at a relatively low temperature as it enters the hydrolyzer. Contrary to expectations, I have found that this procedure does not cause the formation of a troublesome water-in-fat emulsion such as would interfere with the hydrolyzing step, nor does the open steam cause objectionable pressure disturbances or interference with the settling out of sweet water in the lower part of the hydrolyzing chamber.

If the presence of free water in the preheated and presaturated fat is undesirable, as it may be if it is impractical to separate it from the fat before the hydrolyzing step and if glycerine is to be recovered from the sweet water which issues from the hydrolyzer by evaporating water from the sweet water to concentrate the glycerine, the employment of more open steam than the fat can dissolve may be avoided by supplying the fat to the presaturating operation at a higher temperature.

Another permissible variation of my process is the performance of open steam preheating of fat in two or more stages instead of in one stage. This has the advantage of permitting the use of relatively low pressure and less costly steam, for example steam at 150 to 450 pounds per square inch pressure, during the first stage or stages and higher pressure steam only during the last stage, and also the further advantage of permitting the first preheating stage or stages to be performed while the fat is under relatively lower pressure corresponding to the lower pressure of the preheating steam.

The pressure of the open steam employed to bring the fat to any desired temperature is necessarily higher than the pressure of saturated steam at said desired temperature.

The steps of the hydrolyzing process itself, following the preheating and presaturating of the fat in accordance with my improved process, follow previously known practice which I will merely outline very briefly. Reference is made to Mills' U. S. Patent 2,156,863 for a full description of a typical hydrolyzing process. The aforementioned preheated fat-water solution, together with any remaining undissolved free water, is either introduced in a continuous flow into the lower part of a suitable enclosed vertical reaction chamber, or as previously mentioned unheated fat and steam may be separately introduced into this chamber, there to form the preheated fat-water solution. Simultaneously a suitable quantity of water, normally greater in amount than the amount of water dissolved in the fat, is preheated under sufficient pressure to prevent volatilization to approximately the desired reaction temperature (normally about 365° F. to 550° F.) and introduced continuously preferably in comminuted form into the upper part of the same reaction chamber. In this chamber, or reaction zone, which is kept under a pressure at least equal to that of saturated steam at the temperature of the liquids in said chamber, the water is caused to percolate downward through the fat-water solution, as said solution is moved upward through the chamber, thus creating a countercurrent flow of the two reacting materials in intimate contact with each other, whereby the hydrolysis reaction between fat and water progresses with the liberation of fatty acids and glycerine, and whereby the liberated glycerine is washed out of the resulting fat-fatty acid-water solution by the descending flow of water. Fatty acids, with water in solution, which rise towards the top of the chamber, and sweet water which settles to the bottom of the chamber, are constantly withdrawn from near the top and bottom of the chamber respectively as long as the supply to the chamber of fat and water at suitable temperatures is continued.

Having thus described my invention, what I claim and desire to secure by Letters Patent is:

1. In a continuous countercurrent process for hydrolyzing fats, wherein water is dissolved in the fat while same is being preheated and before same participates in the countercurrent reaction step, the step of introducing into said fat a substantial amount of said water in the form of steam, while maintaining said fat under sufficient pressure to cause said steam to condense.

2. The process step of claim 1 in which the steam introduced into the fat is saturated steam.

3. The process step of claim 1 in which the steam introduced into the fat is superheated steam.

4. In a process for hydrolyzing fats by causing preheated fat and preheated water to pass in countercurrent direction in intimate contact with each other at high temperature and pressure, wherein a preheated solution of water in said fat is produced before said fat and said preheated water are introduced into the hydrolysis reaction zone, the step of introducing steam into said fat while same is maintained under a pressure sufficiently high to cause said steam to condense, the amount of steam thus introduced being a substantial amount of the moisture required to produce said solution of water in fat.

5. In a countercurrent process for hydrolyzing fat by causing preheated water and a preheated solution of water in fat to come into intimate contact with each other at high temperature and pressure, the step of preparing said preheated solution of water in fat which comprises introducing steam into fat under a pressure sufficiently high to condense said steam.

6. In a countercurrent process for hydrolyzing fat by causing preheated water and a preheated water-in-fat solution to come into intimate contact with each other at high temperature and pressure in a hydrolysis reaction zone, the step of preheating the fat to be hydrolyzed and predissolving moisture in same which comprises injecting sufficient steam into said fat to raise its temperature substantially to said high temperature while maintaining said fat under sufficient pressure to cause said injected steam to condense.

7. The process step of claim 6 in which the preheating and predissolving step is performed in the hydrolysis reaction zone.

8. The process step of claim 6 in which free water in the preheated fat, in excess of the water dissolved in the fat, is withdrawn prior to the introduction of the preheated fat into the hydrolysis reaction zone.

9. In a countercurrent process for hydrolyzing acidulated soapstock by causing preheated water and a preheated solution of water in said soapstock to come into intimate contact with each other at high temperature and pressure, the step in the preparation of said preheated solution of water in acidulated soapstock of injecting steam into said soapstock while same is maintained under sufficient pressure to cause said steam to condense.

10. The process step of claim 9 in which the acidulated soapstock is acidulated cottonseed oil soapstock.

11. In a continuous process of hydrolyzing fat comprising separately heating fat and water to a temperature between 365° and 600° F., under a pressure between 150 and 1600 pounds per square inch sufficient to keep the water liquid at a temperature used, and said fat being subjected to substantially the same high pressure before contacting said water, passing both fat and water at substantially said high temperature and pressure continuously in a countercurrent direction in contact with each other through a suitable chamber whereby a substantial portion of water dissolves in said fat, the total proportion of water to fat being sufficient to provide a substantial excess of liquid water throughout the operation, the period of contact of fat with water in said chamber being sufficient to cause a substantial splitting of glycerin from the fatty acids, the improvement in the step of separately heating said fat which comprises introducing steam into said fat while maintaining same under sufficient pressure to cause said steam to condense, for the purpose herein described.

NORMAN G. ROBISCH.